United States Patent Office 2,797,436
Patented July 2, 1957

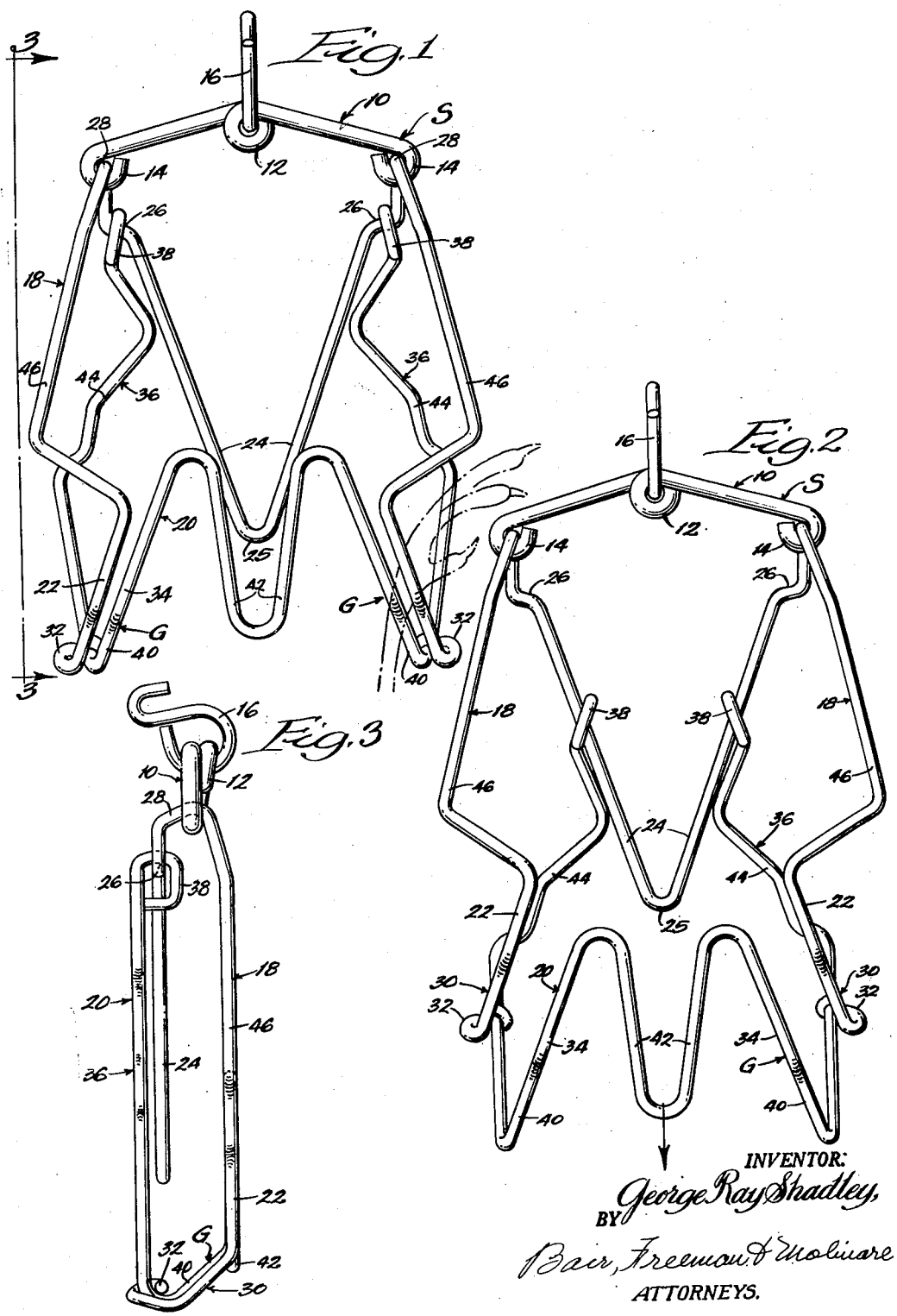

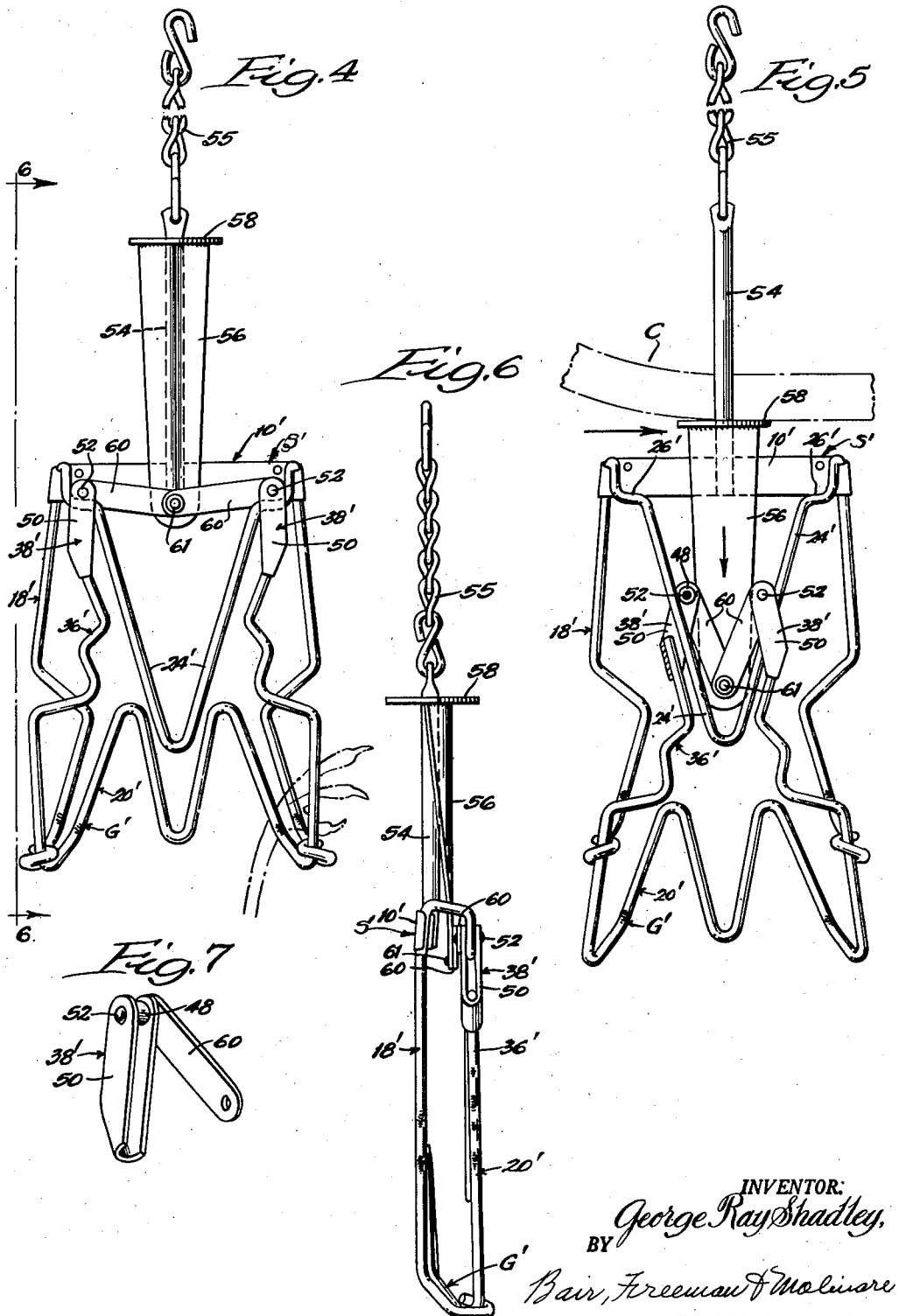

2,797,436

MECHANICAL DISCHARGE SHACKLE FOR FOWLS AND THE LIKE

George Ray Shadley, Ottumwa, Iowa

Application March 22, 1954, Serial No. 417,643

5 Claims. (Cl. 17—44.1)

The present invention pertains to an animal shackle for conveniently supporting fowls, rabbits, etc. for performing various processing operations, such as during killing, scalding, picking, etc. More particularly, this invention is directed to a shackle which is constructed and arranged for discharging the animal from the shackle automatically without necessitating manual lifting of the animal incident to discharging it from the shackle.

Heretofore, shackles have been devised for holding an animal by the legs thereof and having means for opening the shackle to release the legs of an animal without requiring lifting of the animal to release its legs from the shackle. However, such previous shackles usually have included a complex mechanism to be manipulated to cause the shackles to open and close. Such shackles usually are provided with one or more spring members, separate from the shackle members, for applying spring forces to the shackle members for biasing the shackle to either a normally open or closed position. Moreover, this latter type of shackle, due to its being complex, is expensive when compared with previously used simple shackles that merely require lifting of the animal for placement of its legs into and out of the shackle.

One of the objects of this invention is to provide a novel and simplified shackle wherein automatic unloading of the shackle may be achieved without lifting the animal from the shackle and wherein one of the shackle members is formed in part of resilient portions which are adapted to be potentialized by operation of the shackle from its normal condition to one in which the animal is discharged, thereby providing a potentialized means for restoring the shackle to its normal position.

Another object of this invention is to provide a novel and simplified shackle wherein the operative portions thereof are composed solely of two pre-formed wires.

A further object of this invention is to provide a novel shackle having means for effecting automatic unloading thereof without necessitating lifting the animal from the shackle, and wherein the operative portions of the shackle are formed solely from two pre-formed wires.

Still another object of this invention is to provide a novel and simplified shackle which attains the above set forth objects and which is constructed so as to permit either manual or automatic operation thereof.

And still another object of this invention is to provide a shackle which achieves each of the objects above specified and which is characterized by its simplicity and inexpensiveness of construction and operation.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

Figure 1 is a face elevation view showing one form of the shackle embodying my invention in closed or leg-gripping position;

Figure 2 is a face elevation view of the shackle seen in Figure 1 showing the parts in a position for automatically discharging the legs of the animal therefrom;

Figure 3 is a side elevation view, taken on line 3—3 of Figure 1;

Figure 4 is an elevation view of another form of shackle, equipped with automatic operating means therefor, and showing the shackle in closed or leg-gripping position;

Figure 5 shows the shackle of Figure 4 in the leg-discharging position;

Figure 6 is a side elevation view, taken on line 6—6 of Figure 4; and

Figure 7 is a perspective view of a portion of the operating mechanism of the shackle shown in Figures 4–6.

Referring now to the drawings, there is shown in Figures 1–3 one form of a shackle, generally indicated at S, for animals such as fowls, rabbits, or the like. The shackle S, as shown, is of the manually operable type and includes a support bar 10 which, as shown in the particular form of Figures 1–3, is formed of wire. The support bar 10 is formed to define a central ring or eyelet 12 and a pair of end rings 14 for supporting one of the shackle members or frames therefrom. The central ring 12 affords means for securement of the shackle to a hook or link 16, which is adapted to be supported from a conveyor (not shown).

The shackle S includes a first shackle member or frame indicated generally at 18, and a second shackle member or frame generally indicated at 20. Both of the shackle members or frames 18 and 20 are laterally symmetrical about a central vertical plane, and are each formed of a single length of wire, and at least portions of the member or frame 18 are formed of wire of resilient characteristics.

Referring now in particular to the details of the shackle members, the first shackle member 18 being formed of a single length of wire, defines a pair of spaced depending legs 22 which, as best seen in Figure 3, lie substantially in a common first plane. The first shackle member 18 is also formed to define track means, comprising a pair of converging tracks 24, which lie, as best seen in Figure 3, in a second plane, spaced from said first plane. The lower ends of the converging tracks 24 are joined together at 25, defining a V-shaped portion for receiving the neck of an animal when certain operations are to be performed on the animal. The track members 24 are substantially straight along their entire length. The upper end of each track member 24 merges into a lateral offset portion, or jog, which defines a shoulder or stop means 26, for a purpose which will hereinafter be referred to.

The first shackle member 18 also includes a pair of bight portions 28 each of which interconnects one of the track members 24 with one of the spaced legs 22. The bight portions 28 also serve as bridging, or connecting portions, between the portions 22 and 24, of the first shackle member located respectively in said first and second planes. The rings 14 of the support bar 10 encircle and clamp the bight portions 28 of the first shackle member and thereby secure the first shackle member to the support bar 10. The lower end of each depending leg 22 has a portion 30 extending transverse thereto, as seen in Figure 3 of the drawings, and has formed at each of the respective ends thereof, and which are the ends of the single length of wire, a guide ring or loop 32, which extends around and serves as guide means for portions of the other shackle member 20.

The second shackle member 20, formed from a single length of resilient wire, defines a pair of spaced interconnected leg portions 34, each of which is adapted to be normally positioned adjacent and in close spaced relation to one of the spaced legs 22 of the first shackle member. When the shackle members 18 and 20 are in the position shown in Figure 1, each spaced leg 22, and the adjacent leg portion 34 serves to define a leg gripper G for gripping the leg of an animal therebetween, such as, for example, the leg of a fowl, as illustrated in dot and dash lines, being grasped by the right hand leg gripper in Figure 1. Since the leg portions 34 are positioned adjacent the spaced legs 22, they too, lie, as best shown in Figure 3, substantially in said first plane in which said spaced legs 22 lie. It will be noted that the open channel formed by the spaced legs 22 and 34 is of slight, tapered form to facilitate insertion of the leg of an animal in the gripper G.

The second shackle member 20 also defines a pair of upwardly extending arms 36, which are continuations of the respective leg portions 34 and which arms are positioned, as best seen in Figure 3, in a plane spaced in laterally offset relation to the plane of the leg portions 34. The shackle member 20 shown in Figures 1–3 being formed of a single length of resilient wire, hence, the arms 36 of said shackle member 20 possess inherent resiliency.

The upper ends of the arms 36 of the second shackle member 20, are formed to define means for cooperating with the track members 24 and with the stop means 26 of the first shackle member 18. In the particular embodiment shown in Figures 1–3, the upper end of each of the arms 36 defines an encircling member, or ring, 38, which surrounds a portion of the first shackle member 18, and is slidably movable along a track portion 24 of said first shackle member 18, and also is movable into cooperative engagement with the stop means 26 constituting an extension of track portion 24 of said shackle member 18. The second shackle member 20 also defines bight portions 40 which interconnect the arms 36 with the leg portions 34. As shown in Figures 1 and 2, the portion of the shackle member 20 which interconnects the two leg portions 34 is formed to define a V-shaped member 42, which provides clearance for the animal's neck when it is seated in the V-shaped portion of the shackle member or frame 18. Furthermore, the V-shaped portion 42 serves to provide a greater range of spring action for the shackle member 20, in its movement relative to shackle member 18.

The extreme lower outer portions of inclined leg-gripping portion 30, and leg-gripping portion 40, terminate in substantially horizontal planes and serve to provide a shoulder type support for the foot of the animal, so that the animal's feet and body may be suspended in a substantially vertical position. Portions of the arms 36 of the second shackle member pass through the guide rings 32 formed on ends of portions 30 of the first shackle member 18. A portion of each arm 36, between the bight 40 and the encircling member 38, is bent to define a hand grip 44 to provide for grasping the two arms 36 of the second shackle member 20 for compressing said grip portions 44 toward each other and simultaneously exerting a downward force thereon for manipulating the second shackle member from the position in Figure 1 to the position in Figure 2.

The upper portions 46 of the depending legs 22 of the first shackle member 18 are bent laterally outwardly so as to afford clearance for the hand of the operator in grasping the arms 36 of the second shackle member 20 during the operation and manipulation of the shackle.

In its normal operating condition, the shackle members or frames 18 and 20 are in the position shown in Figure 1, with the legs of the animal gripped by the leg-grippers G. To discharge the legs of the animal from the shackle, it is merely necessary to move the shackle member 20 from the position in Figure 1 to the position in Figure 2, whereupon the leg portions 34 of the member or frame 20, are moved away from the legs 22, of the member or frame 18, thus opening the leg-grippers G and permitting the discharge, under the force of gravity, of the animal from the shackle. It will be seen that the mere downward forces which may be applied directly to shackle member 20 are of no avail toward moving shackle member 20 from the position of Figure 1 to the position of Figure 2, because the encircling portions 38 of the second shackle member engage or seat upon the shoulder, or stop, 26, and prevent downward movement of shackle member 20 with respect to shackle member 18. In order to effect movement of shackle member or frame 20 downwardly relatively to shackle member or frame 18, it is necessary to grasp the arms 36 and first move them inwardly toward each other, thus displacing the encircling members 38 inwardly relative to the shoulders, or stops, 26, and then moving the shackle member 20 downwardly.

As the shackle member 20 is moved downwardly from the position seen in Figure 1 to the position seen in Figure 2, the upper ends of the arms 36 are caused to ride along the track means 24, which cause the arms 36 to be biased toward each other against the inherent resiliency of the resilient wire which forms the shackle member 20. The movement of the arms 36 toward each other against the inherent resiliency of the wire serves to potentialize portions of the second shackle member 20, particularly in the arms 36 thereof, whereupon when pressure is released from the grips on the arms 36, after it has reached the position in Figure 2, the potentialized arms 36 react and spread apart, and ride up along the track means 24 and thereby cause movement of the shackle member or frame 20 upwardly relative to shackle member or frame 18, thus restoring the shackle member 20 to the initial or original position with the encircling member 38 seated upon the stop shoulders 26, as shown in Figure 1.

During the movement of the shackle member or frame 20 from the position in Figure 1 to the position in Figure 2, portions of the arms 36 pass downwardly through the guide rings 32, while at the same time portions of the track means 24 pass relatively through the encircling members 38. This arrangement serves to maintain and restrict the two shackle members or frames 18 and 20 in position relative to each other, so that the shackle member 20 is movable only in opposite directions.

In the form of the shackle shown in Figures 4–6, the views are reversed as compared to Figures 1 to 3; however, the basic relationship of parts is substantially the same as that shown in Figures 1–3, with certain improvements and additions. In Figures 4–6, the parts corresponding to parts shown in Figures 1–3 are numbered similarly and are primed. Primarily, although not necessarily, the form of the shackle shown in Figures 4–6 is for use with an automatic means for reciprocating the shackle member or frame 20' with respect to the shackle member or frame 18'. There are, however, additional improvements and features over and above this adaptation. For example, instead of the wire support bar 10 of the construction in Figures 1 to 3, there is provided a sheet metal support bar 10'. In addition, instead of the simple encircling member 38 provided in the construction shown in Figures 1–3, the encircling members 38' shown in Figures 4–6 carry a roller 48, adapted to ride along the tracks 24' for providing reduced resistance to movement of the shackle member or frame 20' with respect to the shackle member or frame 18'. Each encircling member 38' comprises an adapter or clevis 50 which is rigidly secured to the upper end of the arm 36', by any appropriate means, such as by welding. The adapter 50 carries a pin 52 upon which a roller 48 is rotatably mounted and is adapted to coact with one of the tracks 24' and a stop shoulder 26'.

With respect to the means for mechanically moving the shackle member 20' with respect to the shackle member 18', the support bar 10' is provided with an upwardly extending stem or bar 54 adapted for securement by a chain 55 to a conveyor (not shown). A plunger member 56 is provided at its upper end with an apertured flange 58, through which the stem 54 extends, and said stem serves to provide restricted guidance for the plunger member 56 in directions longitudinal of the stem 54. The lower end of plunger 56 has a pair of links 60, each pivoted thereto at one end thereof, as indicated at 61. The other ends of said links 60 are pivotally secured respectively to the encircling portions 38' of the shackle member 20', on the pins 52 which carry the rollers 48.

The operation of the shackle S' as it is being conveyed is that, as the flange 58 moves, in the direction indicated by the arrow in Figure 5, into engagement with a cam member C, it causes movement of the plunger 56 downwardly. The initial downward movement of the plunger 56 is operative to move the upper ends of the arms 36' inwardly toward each other so as to move the rollers 48 away from operative engagement with the shoulders or stops 26', and into cooperative engagement with the tracks 24'. Further downward movement of the plunger 56 is operative to move the entire shackle member 20' downwardly with respect to the shackle member 18', in the manner as described with respect to the form disclosed in Figures 1–3, for automatic opening of the grippers G'. The downward movement of the shackle member 20' effects potentialization of arms 36', and after the plunger 56 moves out of engagement with the cam C, the potentialized arms 36' are operative to bias shackle member 20' back to the original position shown in Figure 4. It is to be understood that the form of shackle represented in Figures 4 to 7, may, if desired, be manually actuated. By the use of the modified encircling members 38', carrying rollers 48, the force required to move frame 20', downwardly to discharging position, is relatively small.

While particular embodiments of this invention have been shown in the figures, it will be appreciated that various changes and modifications may be made in the form of the members shown and described, without departing from the spirit and scope of this invention. In the preferred embodiment, the shackle members 18 and 20 are formed substantially entirely of wire. This, in itself, is believed to be novel and is a decided improvement over prior art shackles, because to the best of my knowledge no automatic discharge type of shackle has ever been heretofore produced wherein the operating members thereof have been formed substantially entirely of wire.

Accordingly, it is intended in the appended claims to cover all possible changes and modifications, which fall within the true spirit and scope of the invention.

What I claim as new, and desire to secure by Letters Patent of the United States is:

1. An animal shackle comprising a pair of frame members having cooperating portions defining a pair of leg grippers for grasping the legs of the animal, one of the members having a pair of wire arms, converging track means on said other member with which said arms cooperate, one of said members being movable relative to the other, said members normally assuming a cooperative position wherein the leg grippers are operative to grasp the legs of an animal, said one member being movable from cooperating position to a position where the legs of the animal are released from said shackle, the movement of said one member away from said cooperative position causing movement of said arms along said track means and effecting potentializing of the resilient arms, said potentialized arms cooperating with said tracks for urging said one member toward said cooperative position, stop means associated with said track means for arresting movement of said arms when said one member moves into said cooperative position, an actuating member, pivotal links interconnecting said pair of arms with said actuating member, the movement of said actuating member in one direction being operative to move said wire arms away from said stop means, and moving said one member relative to the other away from said cooperative position.

2. An animal shackle comprising a first wire member comprising a pair of downwardly depending legs located substantially in a first plane and a pair of inclined converging tracks located substantially in a second plane spaced from said first plane, a second member of resilient wire in operative association with said first member and vertically reciprocably movable relative thereto, said second member comprising a pair of leg members located substantially in said first plane and cooperating, when said second member is in one position, with said depending legs to form a pair of leg grippers, said second member defining a pair of arms located substantially in said second plane and having cooperative relation with said inclined tracks for sliding movement therealong, said second member being movable in a first direction relative to said first member to move said leg members away from said depending legs, so as to open said pair of leg grippers for discharge of an animal's legs therefrom, said movement of said second member being accompanied by movement of said arms along said converging tracks so as to bias said arms toward each other against the inherent resiliency of said second resilient wire member, the release of said second member permitting the resiliency of said second member to operate through said arms against said inclined tracks allowing said arms to move apart relative to each other, thereby causing movement of said arms along said tracks and movement of said second member relative to said first member in a direction opposite to said first direction for restoring said shackle to its original position.

3. An animal shackle comprising a first wire member comprising a pair of downwardly depending legs located substantially in a first plane and a pair of inclined converging tracks located substantially in a second plane spaced from said first plane, a second member of resilient wire in operative association with said first member and vertically reciprocably movable relative thereto, said second member comprising a pair of leg members located substantially in said first plane and cooperating, when said second member is in one position, with said depending legs to form a pair of leg grippers, said second member defining a pair of arms located substantially in said second plane and having cooperative relation with said inclined tracks for sliding movement therealong, said second member being movable in a first direction relative to said first member to move said leg members away from said depending legs, so as to open said pair of leg grippers for discharge of an animal's legs therefrom, said movement of said second member being accompanied by movement of said arms along said converging tracks so as to bias said arms toward each other against the inherent resiliency of said second resilient wire member, the release of said second member permitting the resiliency of said second member to operate through said arms against said inclined tracks allowing said arms to move apart relative to each other, thereby causing movement of said arms along said tracks and movement of said second member relative to said first member in a direction opposite to said first direction for restoring said shackle to its original position, and each of said wire members defining guide means through which a portion of the other wire member passes for restricting the movement of the wire members relative to each other.

4. An animal shackle comprising a first wire member comprising a pair of downwardly depending legs located substantially in a first plane and a pair of inclined converging tracks located substantially in a second plane spaced from said first plane, a second member of resilient wire in operative association with said first member, and vertically reciprocably movable relative thereto, said second member comprising a pair of leg members located substantially in said first plane and cooperating, when said second member is in one position, with said depending legs to form a pair of leg grippers, said second member defining a pair of arms located substantially in said second plane and having cooperative relation with said inclined tracks for sliding movement therealong, said second member being movable in a first direction relative to said first member to move said leg members away from said depending legs, so as to open said pair of leg grippers for discharge of an animal's legs therefrom, said movement of said second member being accompanied by movement of said arms along said converging tracks so as to bias said arms toward each other against the inherent resiliency of said second resilient wire member, the release of said second member permitting the resiliency of said second member to operate through said arms against said inclined tracks allowing said arms to move apart relative to each other, thereby causing movement of said arms along said tracks and movement of said second member relative to said first member in a direction opposite to said first direction for restoring said shackle to its original position, and said first wire member having formed therein at the upper end of each of said inclined tracks a lateral offset portion defining a stop for engagement and cooperation with the pair of arms of said second wire member to resist movement of said wire members relative to each other until said arms are distorted to a position away from engagement with said stops.

5. An animal shackle comprising a first wire frame member shaped to define a pair of spaced legs lying substantially in a first plane, a pair of converging tracks connected at one end to a respective leg and lying substantially in a second plane, spaced from said first plane, the other end of each spaced leg comprising a portion extending transverse to said leg, the extended end of said transverse portion terminating in a guide ring, a portion of said wire between each leg and its associate track being shaped to define stop means therein; a second wire frame member shaped to define a pair of spaced interconnected leg portions, adapted to be positioned adjacent the pair of spaced legs of said first wire to define a pair of spaced leg grippers, a pair of arms connected to the respective leg portions and each having a portion slidably engaged in said guide rings, of the first wire member, the end of each of said arm being slidably engaged with one of said tracks; said first and second wire members normally assuming a cooperative position where said legs of the first wire and leg portions of the second wire coact to form leg grippers adapted to grasp the legs of an animal therebetween, and one of said wire members being movable relative to the other to a position where said legs and leg portions are moved apart for releasing the legs of the animal; said guide rings on said first wire, with portions of said second wire extending therethrough, and the ends of the arms of said second wire coacting with portions of said first wire serving to maintain said two wire frames in operative relation to each other.

References Cited in the file of this patent

UNITED STATES PATENTS

| | | |
|---|---|---|
| 1,742,569 | Barker et al. | Jan. 7, 1930 |
| 2,035,948 | De Vout | Mar. 31, 1936 |
| 2,405,638 | Bilek | Aug. 13, 1946 |
| 2,632,201 | Van Dolah | Mar. 24, 1953 |
| 2,644,981 | Crane | July 14, 1953 |
| 2,688,765 | Sharp et al. | Sept. 14, 1954 |